C. F. JOHNSON.
Tobacco Hoisting Device.
No. 204,332. Patented May 28, 1878.
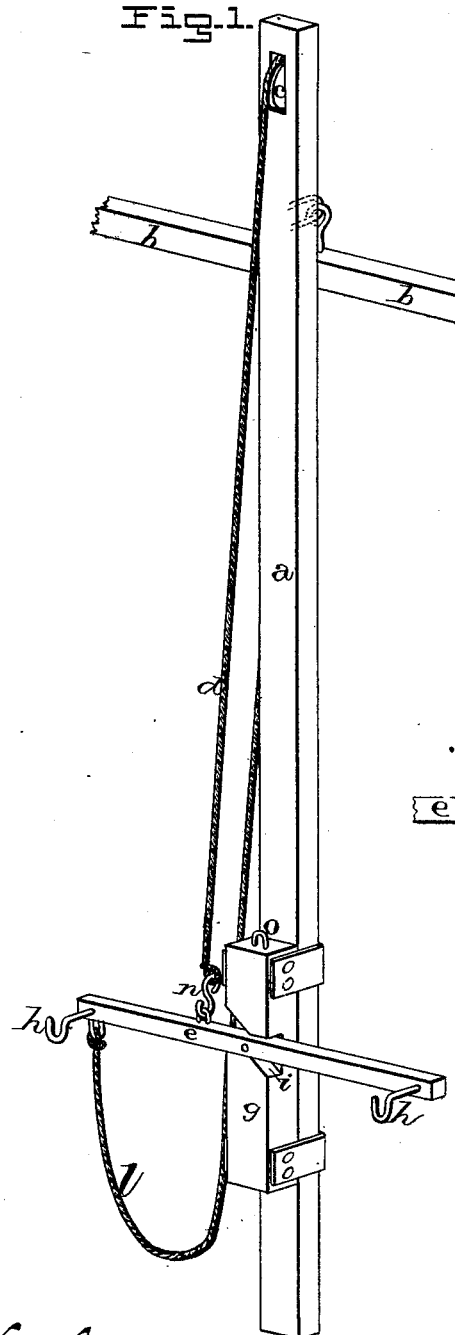

UNITED STATES PATENT OFFICE.

CYRUS F. JOHNSON, OF CANTON, KENTUCKY.

IMPROVEMENT IN TOBACCO-HOISTING DEVICES.

Specification forming part of Letters Patent No. 204,332, dated May 28, 1878; application filed April 30, 1878.

*To all whom it may concern:*

Be it known that I, CYRUS F. JOHNSON, of Canton, in the county of Trigg and State of Kentucky, have invented certain new and useful Improvements in Tobacco-Hoisters; and I do hereby declare the following to be a full, clear, and exact description of the invention, such as will enable others skilled in the art to which it pertains to make and use it, reference being had to the accompanying drawings, which form part of this specification.

My invention relates to an improvement in tobacco-hoisters; and it consists in the arrangement and combination of devices, that will be more fully described hereinafter, whereby the tobacco-plants may be hoisted into position and left upon the beams or poles in the dry-house to dry.

The accompanying drawings represent my invention.

$a$ represents a long pole or beam, which is loosely fastened to the cross-piece $b$ at any suitable distance below its top, in such a manner that the pole or beam can be turned partially around in either direction. Through the upper end of this pole or beam is made a mortise, and in this mortise is placed the pulley $c$, over which the hoisting rope, wire, or chain $d$ passes. One end of this rope fastens to the cross-bar $e$, to one side of its center, while the other end fastens to a staple in the under edge of the bar, at one end. This bar $e$ is pivoted at its center to the guide or runner $g$, which moves back and forth upon the pole $a$, and is provided with a hook, $h$, at each end, upon which to hang the stick that holds the plants. In the surface of the runner $g$ is cut a diagonal recess, $i$, of the shape shown, in which the cross-bar $e$ is pivoted, and which recess acts as a stop to prevent the bar from moving too far up or down.

In using this invention the upper end of the pole $a$ is passed between the top tier poles in the barn or drying-house until the cross-piece $b$ can be turned across them, and thus act as a support for the pole $a$. While thus supported, the pole $a$ can be turned partially around in both directions. The stick that holds the plants is hung upon the hooks $h$, and the rope $d$ is pulled upon, so as to raise the runner $g$, carrying the cross-bar $e$ and the tobacco up with it to any desired height. As the rope is fastened to the bar $e$ at one side of its center, the bar is drawn into an inclined position as it rises upward, and after it reaches the proper height the rope is drawn upon at $l$, while the rope is held sufficiently taut to prevent the runner $g$ from sliding down the pole $a$, so that the upper end of the bar $e$ will be drawn down to a level with the other end. By turning the pole $a$ from side to side the tobacco-plants can be moved over and left upon the poles upon which they are to hang and dry. Should it be desired to apply the elevating power directly to the runner, the hook $n$ on the end of the rope will be fastened to the staple $o$.

By means of this invention tobacco and other plants can be raised with great rapidity and ease into the positions upon the poles that they are intended to occupy.

Having thus described my invention, I claim—

1. The runner $g$, having the diagonal groove $i$ in its side, in combination with the cross-bar $e$, pivoted therein so as to have a limited end play, substantially as shown.

2. The combination of the bar $e$, runner $g$, having the diagonal groove $i$, upright $a$, and cross-bar $b$, one end of the rope $d$ being fastened to the bar $e$ at one side of its center, and the other end of the rope fastened to the outer end of the bar, substantially as described.

In testimony that I claim the foregoing I have hereunto set my hand this 15th day of April, 1878.

CYRUS FRANKLIN JOHNSON.

Witnesses:
 JNO. D. SHOW,
 A. W. THOMAS.